US009261416B2

(12) United States Patent
Tobo et al.

(10) Patent No.: US 9,261,416 B2
(45) Date of Patent: Feb. 16, 2016

(54) THERMOCOUPLE ABNORMALITY DETECTION SYSTEM AND DETECTION METHOD THEREOF

(75) Inventors: Masayuki Tobo, Kawasaki (JP); Yuma Eto, Sagamihara (JP); Mamoru Fukui, Yokohama (JP); Noboru Morohoshi, Yokohama (JP); Shigeru Yamaji, Yokohama (JP)

(73) Assignees: KABUSHIKI KAISHA TOSHIBA, Tokyo (JP); TOSHIBA PLANT SYSTEMS & SERVICES CORPORATION, Yokohama-shi (JP)

( * ) Notice: Subject to any disclaimer, the term of this patent is extended or adjusted under 35 U.S.C. 154(b) by 651 days.

(21) Appl. No.: 13/543,197

(22) Filed: Jul. 6, 2012

(65) Prior Publication Data
US 2013/0028285 A1 Jan. 31, 2013

(30) Foreign Application Priority Data

Jul. 25, 2011 (JP) .................................. 2011-162426

(51) Int. Cl.
| | |
|---|---|
| G01K 15/00 | (2006.01) |
| G01K 19/00 | (2006.01) |
| G01K 7/04 | (2006.01) |
| G01K 1/02 | (2006.01) |

(52) U.S. Cl.
CPC ....... *G01K 7/04* (2013.01); *G01K 1/026* (2013.01); *G01K 15/007* (2013.01)

(58) Field of Classification Search
CPC ....... G01K 7/02; G01K 15/00; G01K 15/007; G01K 1/026; G01K 7/04; G01R 31/026; H01L 35/28; H01L 35/32
See application file for complete search history.

(56) References Cited

U.S. PATENT DOCUMENTS 3,943,488 A * 3/1976 Kazahaya ................ 340/870.14
5,663,899 A * 9/1997 Zvonar et al. ................ 702/130

FOREIGN PATENT DOCUMENTS

| | | |
|---|---|---|
| DE | 1 281 173 | 10/1968 |
| EP | 2 375 157 A1 | 10/2011 |
| JP | 2-147927 | 6/1990 |
| JP | 4-165290 A | 6/1992 |

(Continued)

OTHER PUBLICATIONS

Office Action issued Jun. 11, 2014 in German Patent Application No. 10 2012 014 231.5 (with English translation).

(Continued)

*Primary Examiner* — Lisa Caputo
*Assistant Examiner* — Janice M Soto
(74) *Attorney, Agent, or Firm* — Oblon, McClelland, Maier & Neustadt, L.L.P.

(57) ABSTRACT

According to one embodiment, a thermocouple abnormality detection system including: a plurality of thermocouples each including a plurality of thermocouple wires housed in a sheath; a transmission signal conversion unit configured to convert a thermo-electromotive force generated by each of the plurality of the thermocouple wires to a transmission signal and to output the transmission signal; a transmission unit configured to transmit the transmission signal outputted from the transmission signal conversion unit; and an abnormality detection circuit configured to detect an abnormality of each of the plurality of the thermocouples by comparing, with each other, the transmission signals obtained from the plurality of thermocouple wires provided in each of the thermocouples.

8 Claims, 9 Drawing Sheets

(56) References Cited

FOREIGN PATENT DOCUMENTS

| | | | |
|---|---|---|---|
| JP | 2003-208687 A | | 7/2003 |
| JP | 2003208687 | * | 7/2003 |
| JP | 2008-21057 | | 1/2008 |
| JP | 2009-180188 A | | 8/2009 |
| JP | 2010-256166 | | 11/2010 |
| JP | 2010256166 | * | 11/2010 |

OTHER PUBLICATIONS

Office Action issued on Dec. 9, 2014 in the corresponding Japanese Patent Application No. 2011-162426.

* cited by examiner

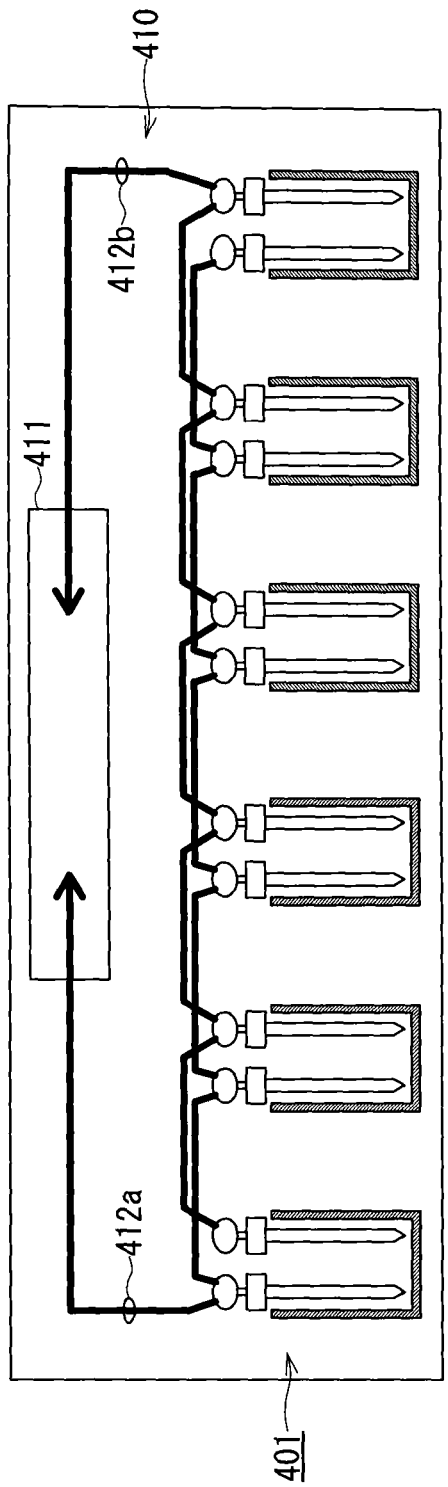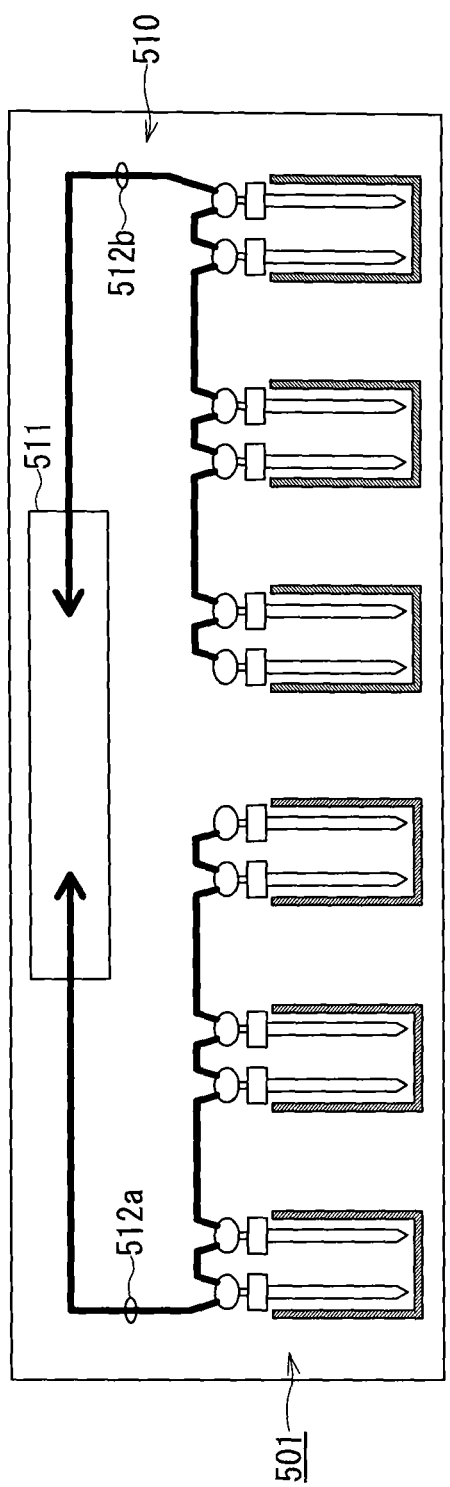

THERMOCOUPLE ABNORMALITY DETECTION SYSTEM AND DETECTION METHOD THEREOF

CROSS-REFERENCE TO RELATED APPLICATION

This application is based upon and claims the benefit of priority from Japanese Patent Application No. 2011-162426, filed Jul. 2, 2011; the entire contents of which are incorporated herein by reference.

FIELD

Embodiments of the present invention relates to a thermocouple abnormality detection system and detection method thereof used in an industrial plant.

BACKGROUND

A thermocouple is provided in an industrial plant, and the temperature information obtained from the thermocouple is used as an index for evaluating the performance of the industrial plant. The thermo-electromotive force generated by the thermocouple is inputted into a monitoring and control apparatus so as to be used for temperature monitoring and temperature control.

The thermocouple is gradually deteriorated by being subjected to stress due to repeated expansion and contraction caused by temperature change. The thermocouple is provided with a system for detecting the deterioration thereof. When the deterioration of the thermocouple is detected by the system, a measure, such as exchanging the thermocouple, is taken by plant maintenance personnel.

As an example of the conventional detection system, a detection system provided with two active and standby thermocouples is known. The conventional detection system has such a merit that an abnormality of the standby side thermocouple can be monitored by monitoring the difference between the detection signals of the two thermocouples.

BRIEF DESCRIPTION OF THE DRAWINGS

In the accompanying drawings:

FIG. 7A is a view showing a configuration of a thermocouple abnormality detection system according to the second embodiment in the case where a large number of thermocouples are provided;

FIG. 7B is a view showing a configuration of a thermocouple abnormality detection system as a comparison example of the thermocouple abnormality detection system shown in FIG. 7A;

DETAILED DESCRIPTION

Embodiments of a thermocouple abnormality detection system and a detection method thereof according to the present invention will be described with reference to the accompanying drawings.

In some industrial plants, a large number (such as 100 to 300) of thermocouples can be provided. In the case where, in addition to active thermocouples, a large number of standby thermocouples are provided, it is necessary that, in addition to the 100 to 300 thermocouples, 100 to 300 standby thermocouples are further provided.

This significantly increases the construction work and the installation cost which are required for installing the thermocouples. Further, in order to transmit a detection signal to a monitoring and control apparatus from each of the thermocouples, it is necessary to extend the thermocouples or to install cables for transmitting electric signals converted from the thermo-electromotive forces of the thermocouples. Thus, it has been actually impossible to install such large number of thermocouples.

The embodiments according to the present invention have been made in view of the above described circumstances. An object of the embodiments according to the present invention is to provide a thermocouple abnormality detection system and a detection method thereof capable of suitably detecting an abnormality of a thermocouple.

This and other objects can be achieved according to the present invention by providing a thermocouple abnormality detection system including: a plurality of thermocouples each including a plurality of thermocouple wires housed in a sheath; a transmission signal conversion unit configured to convert a thermo-electromotive force generated by each of the plurality of the thermocouple wires to a transmission signal and to output the transmission signal; a transmission unit configured to transmit the transmission signal outputted from the transmission signal conversion unit; and an abnormality detection circuit configured to detect an abnormality of each of the plurality of the thermocouples by comparing, with each other, the transmission signals obtained from the plurality of thermocouple wires provided in each of the thermocouples.

First Embodiment

A first embodiment of a thermocouple abnormality detection system and a detection method thereof according to the present invention will be described with reference to the accompanying drawings.

Figure 1:
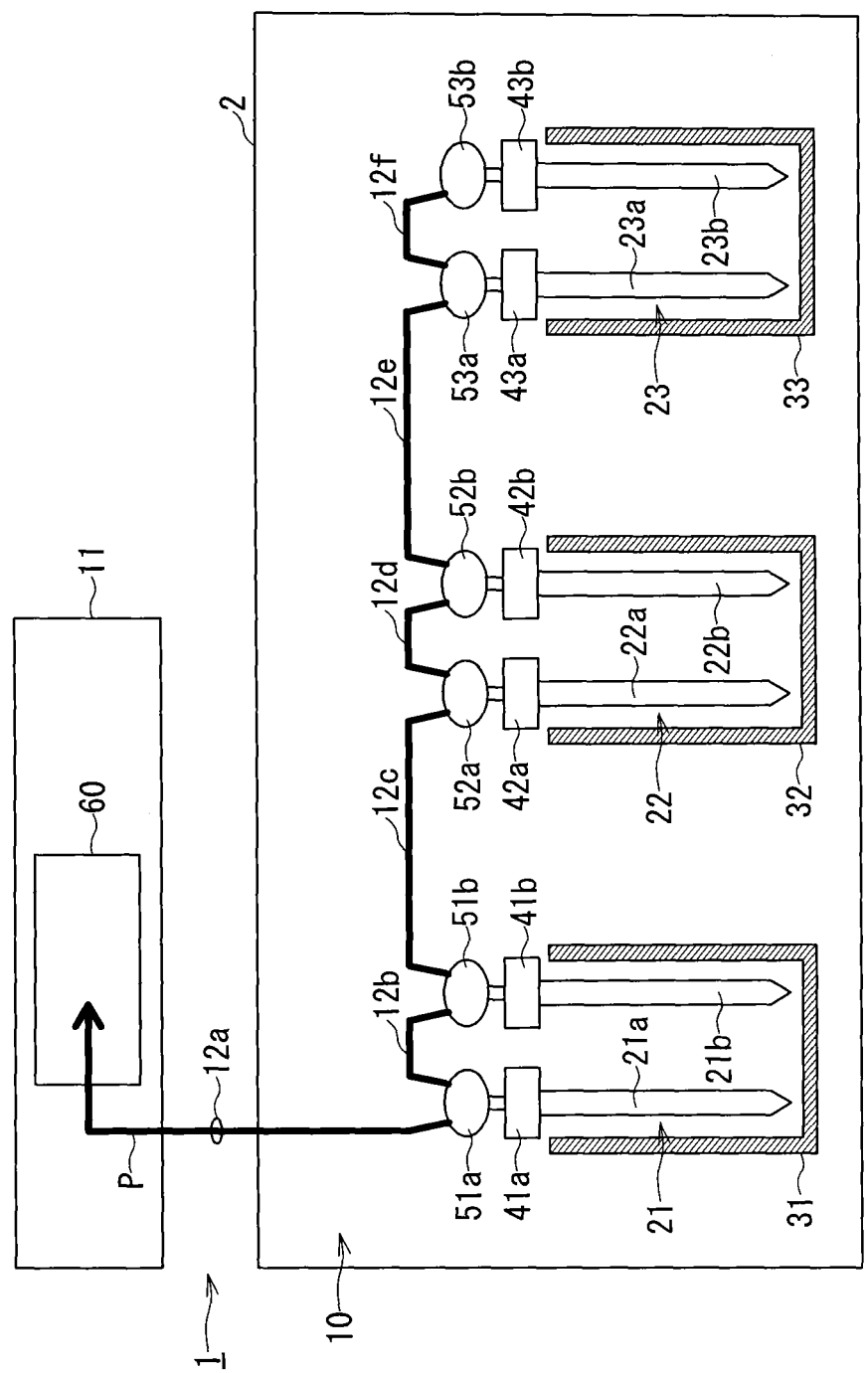
FIG. 1 is a view showing a configuration of a first embodiment of a thermocouple abnormality detection system according to the present invention.

FIG. 1 is a view showing a configuration of a first embodiment of a thermocouple abnormality detection system according to the present invention.

A thermocouple abnormality detection system (abnormality detection system) 1 according to a first embodiment is provided in an industrial plant, such as a thermal power generation plant, a nuclear power generation plant, a chemical plant, and various factories.

The abnormality detection system 1 includes a temperature measurement system 10 mainly provided in an industrial plant 2, a monitoring and control apparatus 11 provided, for example, outside the industrial plant 2, and transmission cables 12a to 12f for connecting the temperature measurement system 10 to the monitoring and control apparatus 11.

For example, 100 to 300 of thermocouple pairs are provided in the industrial plant 2 (for example, when 500 instrument sensors are provided as a whole). In the first embodiment, three thermocouple pairs 21 to 23 are illustrated for convenience of description. Each of the thermocouple pairs 21 to 23 is provided in a predetermined measurement area, such as an apparatus installation site area.

The apparatus installation site area is an area in the industrial plant 2, in which area facility apparatuses, such as a pump, a fan, a turbine, and a valve, and pipes are arranged. The apparatus installation site area is also an area in the industrial plant 2, in which area main facility apparatuses are particularly intensively arranged. Note that the apparatus installation site area is not clearly separated from the other area, and a part of the facility apparatuses, and the like, are also installed in the other area.

Since the thermocouple pairs 21 to 23 have almost the same configuration, only the thermocouple pair 21 is described, and the description of the other thermocouple pairs 22 and 23 is omitted.

The thermocouple pair 21 includes a thermocouple wire 21a (first thermocouple) and a thermocouple wire 21b (second thermocouple). The thermocouple pair 21 (so-called two-wire thermocouple) is housed in a sheath 31. The sheath 31 has a cylindrical shape, and has the outer layer made of a heat-resistant alloy to thereby protect the thermocouple wires 21a and 21b housed therein. In the sheath 31, each of the thermocouple wires 21a and 21b is fixed and insulated by a filler, such as magnesium oxide.

Each of the thermocouple wires 21a and 21b has, at the tip portion thereof, a hot junction as a measurement place, and also has a cold junction (head portion) at the end portion opposite to the measurement place. The thermocouple wires 21a and 21b respectively include, at the cold junctions thereof, A/D converters 41a and 41b, and adapters 51a and 51b in this order.

The A/D converters 41a and 41b (transmission signal conversion units) respectively A/D-convert thermo-electromotive forces generated in the thermocouple wires 21a and 21b into transmission signals, so as to output the transmission signals. The adapters 51a and 51b (transmission units) transmit the transmission signals transmitted from the A/D converters 41a and 41b to the transmission cables 12a and 12b, respectively.

Note that each of the thermocouples 21 to 23 may be configured such that an apparatus, in which each of the A/D converters 41a to 43a and 41b to 43b, and each of adapters 51a to 53a and 51b to 53b are integrated, is incorporated in the cold junction, or the like. The transmission signals may be transmitted to the monitoring and control apparatus 11 via a relay apparatus provided between the monitoring and control apparatus 11, and the adapters 51a to 53a and 51b to 53b.

The transmission cables 12a to 12f are, for example, optical cables, and transmit, to the monitoring and control apparatus 11, the transmission signals transmitted from the adapters 51a to 53a and 51b to 53b, respectively.

The transmission cable 12a connects the adapter 51a to the monitoring and control apparatus 11. The transmission cable 12b connects between the adapters 51a and 51b provided at the thermocouple pair 21, that is, connects between the adapters 51a and 51b of the thermocouple pair 21. The transmission cable 12c connects the adapter 51b of the thermocouple pair 21 to the adapter 52a of the thermocouple pair 22.

Similarly, the transmission cable 12d connects between the adapters 52a and 52b of the thermocouple pair 22, and the transmission cable 12f connects between the adapters 53a and 53b of the thermocouple pair 23. The transmission cable 12e connects the adapter 52b of the thermocouple pair 22 to the adapter 53a of the thermocouple pair 23.

That is, the transmission cable 12a as a second connection unit connects the thermocouple wire 21a (adapter 51a) to the monitoring and control apparatus 11 (abnormality detection circuit 60). The transmission cables 12b to 12f as first connection units connect between the plurality of mutually adjacent thermocouples 21 to 23 (adapters 51a to 53a and 51b to 53b).

The transmission cables 12a to 12f are connected by a wiring system (so-called Daisy Chain system) in which the mutually adjacent thermocouples 21 to 23 (adapters 51a to 53a and 51b to 53b) are connected in series. The transmission signal transmitted from each of the adapters 52a, 53a, and 51b to 53b are successively transmitted through the required transmission cables 12b to 12f, so as to be transmitted to the adapter 51a. Eventually, the respective transmission signals are collected and transmitted as a transmission signal P to the monitoring and control apparatus 11 through the transmission cable 12a.

In the Daisy Chain system, only one cable of the transmission cable 12a is used as the transmission cable (second connection unit) which is laid over a long distance (generally, a length of 200 m to 400 m) so as to be connected to the monitoring and control apparatus 11. The transmission cables 12b to 12f other than the transmission cable 12a need only to be capable of connecting between mutually adjacent adapters 51a to 53a and 51b to 53b, and hence need only to have a very short length (generally, 10 m to 20 m).

Even in the case where the number of thermocouples is increased, it is only necessary that the transmission cables 12b to 12f having very short lengths are laid between the adapters 51a to 53a and 51b to 53b. Thus, from the viewpoint of reducing the amount of cables, the Daisy Chain system is advantageous.

Note that any of one-core cable or two-core cable may also be used as the transmission cables 12a to 12f. When two-core cables are applied, the transmission cables 12a to 12f can also perform power supply from the monitoring and control apparatus 11 to the A/D converters 41a to 43a and 41b to 43b and the adapters 51a to 53a and 51b to 53b, in addition to the transmission of the transmission signals. Each of the transmission cables 12a to 12f is configured as a single cable in which one core for supplying a positive voltage and the other core for supplying a negative voltage are paired so as to satisfy the predetermined functions.

The monitoring and control apparatus 11 monitors measurement values on the basis of the transmission signals which are measured by the thermocouples 21 to 23 and transmitted by the on-site transmission. The monitoring and control apparatus 11 includes the abnormality detection circuit 60.

Figure 2:
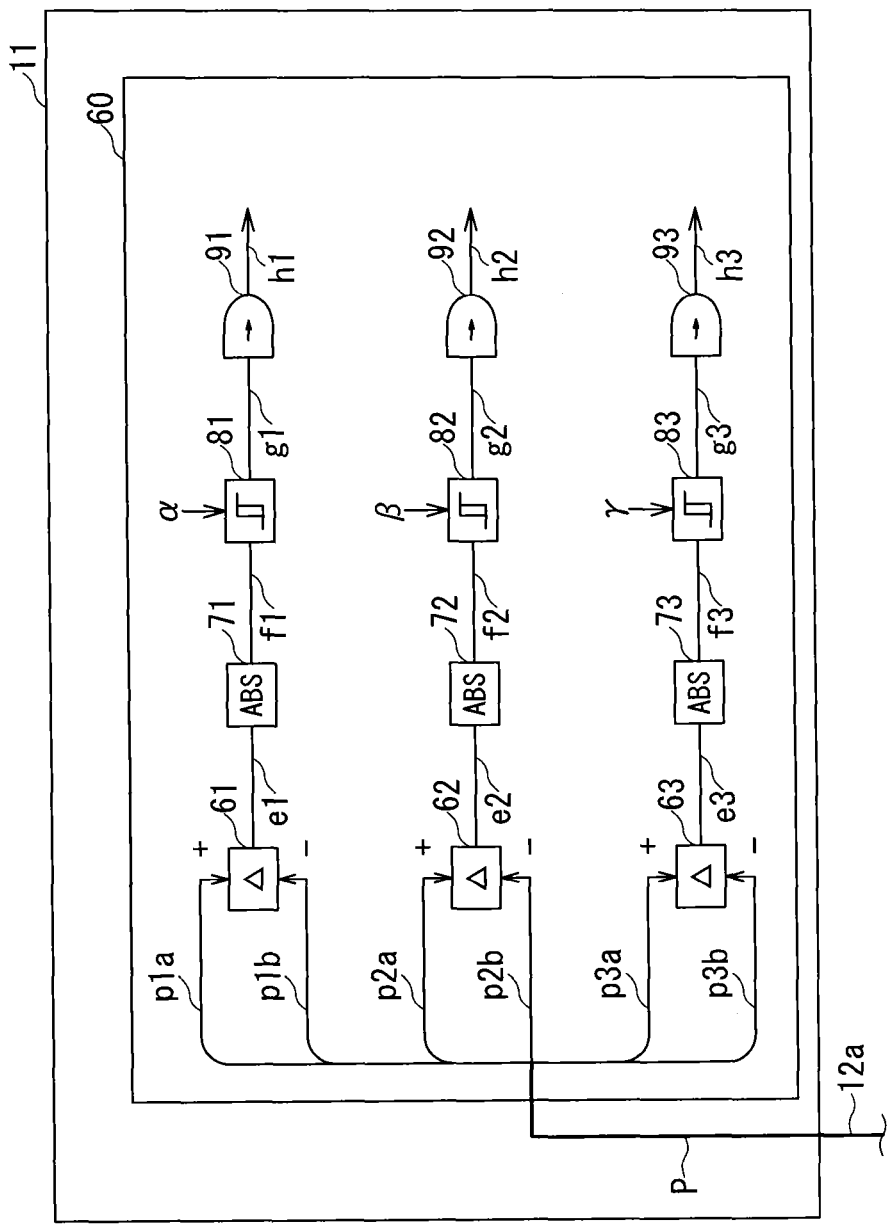
FIG. 2 is a view showing an internal configuration of an abnormality detection circuit provided in a monitoring and control apparatus.

FIG. 2 is a view showing an internal configuration of the abnormality detection circuit 60 provided in the monitoring and control apparatus 11.

In the abnormality detection circuit 60, transmission signals p1a to p1a and p1b to p3b outputted from the respective thermocouples 21 to 23 are taken out from the transmission signal P supplied through the transmission cable 12a, and are respectively supplied to subtractors 61 to 63.

Among the set of subtractors 61 to 63, a set of absolute value converters 71 to 73, a set of comparators 81 to 83, and a set of timers 91 to 93, the components in each of the sets have the almost same configuration. Thus, only the subtractor 61, the absolute value converter 71, and the comparator 81, and the timer 91 will be described, and the description of the other components, that is, the description of the subtractors 62 and 63, the absolute value converters 72 and 73, the comparators 82 and 83, and the timers 92 and 93 will be omitted.

The subtractor 61 calculates a deviation e1 by performing subtraction between the transmission signals p1a and p1b outputted from the thermocouple pair 21 (thermocouple wires 21a and 21b). The absolute value converter 71 calculates an absolute deviation f1 by converting the absolute value of the deviation e1. The absolute deviation f1 becomes a positive value irrespective of the magnitude relationship between the transmission signals p1a and p1b.

The comparator 81 compares the absolute deviation f1 with a threshold value $\alpha$ set beforehand. The comparator 81 outputs an output g1, when the absolute deviation f1 is larger than the threshold value $\alpha$. In the case where the transmission signal at the time of generation of the maximum thermo-electromotive force is set to 100%, the threshold value $\alpha$ is selected to be, for example, about 5% of the value of the transmission signal.

The timer 91 issues an abnormality signal h1 when the output g1 is continuously outputted during a predetermined time period (for example, 15 seconds). The timer 91 prevents that the abnormality signal h1 is frequently generated due to a temporary increase in the deviation e1 resulting from the difference in the response speed between the thermocouple wires 21a and 21b.

Next, the effects of the thermocouple abnormality detection system 1 according to the first embodiment will be described.

The thermocouple wires are gradually deteriorated by being subjected to stress due to repeated expansion and contraction caused by temperature change. For example, when the thermocouple wire 21b is deteriorated more rapidly than the thermocouple wire 21a and becomes unable to generate a thermo-electromotive force, the transmission signal p1b represents an abnormal value.

On the other hand, the thermocouple wire 21a is normal as compared with the thermocouple wire 21b, and hence the transmission signal p1a represents a normal value. When the transmission signal p1a is compared with the transmission signal p1b, the absolute deviation f1 is increased. Eventually, the abnormality detection circuit 60 issues the abnormality signal h1, so that the abnormality is detected.

A plant operator can know the occurrence of the abnormality by the abnormality detection, and specifies which of the thermocouple wires is abnormal. The abnormality is specified, for example, by referring to the trend graphs of the transmission signal p1a and the transmission signal p1b, and the like.

Here, the superiority of the abnormality detection system 1 according to the first embodiment will be described by using an abnormality detection system as a comparison example.

Figure 3:
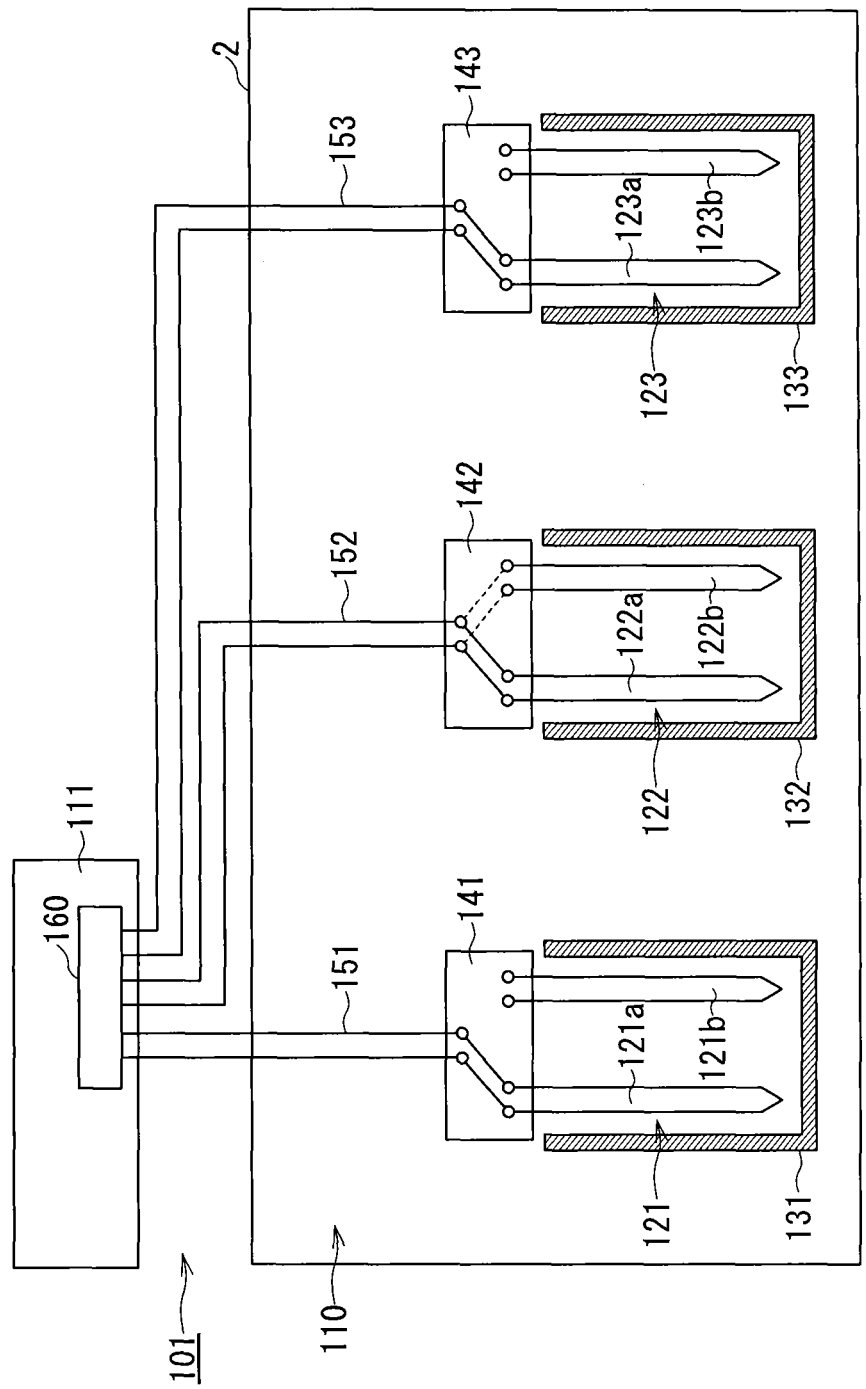
FIG. 3 is a view showing an abnormality detection system as a comparison example of a thermocouple abnormality detection system according to the first embodiment.

FIG. 3 is a view showing an abnormality detection system 101 as a comparison example of the thermocouple abnormality detection system 1 according to the first embodiment.

An abnormality detection system 101 includes a temperature measurement system 110, and a monitoring and control apparatus 111 provided, for example, outside the industrial plant 2.

The temperature measurement system 110 includes thermocouple pairs 121 to 123 which are two-wire thermocouples. The thermocouple pairs 121 to 123 have almost the same configuration, and hence only the thermocouple pair 121 is described, and the description of the other thermocouple pairs 122 and 123 is omitted.

A thermocouple wire 121a and a thermocouple wire 121b are housed in a sheath 131. The thermocouple wires 121a and 121b includes a terminal box 141 at the cold junction. From the terminal box 141, the thermo-electromotive force (small thermo-electromotive force) generated in each of the thermocouple wires 121a and 121b is supplied to a compensation lead wire 151.

The compensation lead wire 151 is connected to one (the thermocouple wire 121a in FIG. 3) of the thermocouple wires of the thermocouple pair 121.

The monitoring and control apparatus 111 includes an I/O board 160. The thermo-electromotive forces of the thermocouples 121 to 123 are inputted into the I/O board 160 through compensation lead wires 151 to 153, respectively.

Note that the thermocouples 121 to 123 may be directly connected to the I/O board 160. However, the distance between the I/O board 160 and the thermocouples 121 to 123 is large (for example, 200 m to 400 m), and hence extremely long thermocouples 121 to 123 are needed, resulting in high cost. For this reason, the thermocouples 121 to 123 are connected to the I/O board 160 by the compensation lead wires 151 to 153, respectively.

The I/O board 160 includes a disconnection detection circuit. The disconnection detection circuit includes a power source to apply a voltage to each of thermocouple wires 121a to 123a and 121b to 123b at each predetermined period. When one of the thermocouple wires 121a to 123a and 121b to 123b is disconnected, a phenomenon (burnout), in which the applied voltage is greatly increased by being charged by the input portion, is caused, and thereby the disconnection detection circuit detects the disconnection.

Temperatures of measurement object portions are transmitted to the hot junctions of the thermocouples 121 to 123 via sheaths 131 to 133, respectively. At this time, the thermocouples 121 to 123 are repeatedly subjected to rapid temperature changes. The thermocouples 121 to 123 are gradually deteriorated by being subjected to stress due to repeated expansion and contraction, and are eventually disconnected (broken).

For example, when the disconnection of the thermocouple wire 122a is detected, the connection to the disconnected thermocouple wire 122a is removed in a terminal box 142 by plant maintenance personnel. The thermocouple wire 122b which is paired with the thermocouple wire 122a is connected to the compensation lead wire 152 in the terminal box 142 (illustrated by dotted lines in FIG. 3). As a result, the thermo-electromotive force of the exchanged thermocouple wire 122b is transmitted to the I/O board 160.

In the case where single wire thermocouples, in each of which one thermocouple wire (for example, each of thermocouple wires 121a to 123a) is housed in each of the sheaths 131 to 133, are used, and where one of the thermocouple wires 121a to 123a is disconnected, a new thermocouple used as a substitution of the disconnected one of the thermocouple wires 121a to 123a is needed. Thus, when the single wire thermocouples are used, the replacement work and the cost for the replacement are required at the time of the disconnection.

On the other hand, in the case where the two wire thermocouples 121 to 123 are used as shown in FIG. 3, the disconnected thermocouple wire can be easily exchanged by a simple work of changing the connection in the terminal box 141 to 143. That is, in the abnormality detection system 101 of the thermocouples 121 to 123, the thermocouple pairs 121 to 123 (two-wire thermocouples) are provided mainly in view of the disconnection of the thermocouple wire.

Here, in an actual industrial plant, a large number (such as 100 to 300) of two-wire thermocouples 121 to 123 are installed. For this reason, in view of the installation work and the cost, it is unrealistic that the thermo-electromotive forces obtained from both of the thermocouple wires 121a to 123a and of the thermocouple wires 121b to 123b of the two-wire thermocouples 121 to 123 are inputted into the monitoring and control apparatus 111.

Specifically, in the case where, in the thermocouple abnormality detection system 101 as the comparison example, the thermo-electromotive forces of both of the thermocouple wires 121a to 123a and of the thermocouple wires 121b to 123b of the two-wire thermocouples 121 to 123 are inputted to the I/O board 160, each of the compensation lead wire pairs 151 to 153 are needed for each of the thermocouple wires 121a to 123a and 121b to 123b. That is, the number of the necessary compensation lead wires 151 to 153 is doubled, resulting in an increase in the installation work and the cost.

Further, when the number of the compensation lead wires 151 to 153 is doubled, the number of input points of the I/O board 160 is also doubled. Further, in order to input the thermo-electromotive forces into the monitoring and control apparatus 111, A/D conversion processing, and the like, for converting the analog voltage signals to digital signals are needed, so that the operation load of the monitoring and control apparatus 111 is increased.

On the other hand, the thermocouple abnormality detection system 1 according to the first embodiment uses the on-site transmission in which the thermo-electromotive forces generated by the thermocouples 21 to 23 are converted into transmission signals, and in which the transmission signals are then transmitted to the monitoring and control apparatus 11. Thus, the abnormality detection system 1 of the thermocouples 21 to 23 can suitably detect an abnormality of the thermocouples 21 to 23 while efficiently utilizing merits of the two-wire thermocouples 21 to 23. That is, from the measurement results of each of the two-wire thermocouples 21 to 23, it is possible to surely detect the deterioration of each of the thermocouples at an early stage in the process before each of the thermocouples is disconnected.

In the thermocouple abnormality detection system 1, only the transmission cable 12a is used as the transmission cable connected to the abnormality detection circuit 60 (monitoring and control apparatus 11), and the transmission signal P is transmitted via the transmission cable 12a. Thereby, the labor, time and cost required for laying the cables can be reduced as compared with the case where long cables (compensation lead wires 151 to 153) are required in correspondence with the number of the thermocouple wires 121a to 123a and 121b to 123b as in the comparison example of the abnormality detection system 101.

In the abnormality detection system 1, the transmission signal P, which is a digital signal, is transmitted to the monitoring and control apparatus 11 by using a on-site transmission technique. Thereby, the load of the arithmetic operation, such as A/D conversion processing performed by the monitoring and control apparatus 11, is reduced.

The transmission cables 12b to 12f for connecting between the thermocouple wires 21a to 23a and 21b to 23b of each of the thermocouple pairs 21 to 23, and for connecting between the thermocouple wires 21a to 23a and 21b to 23b of the mutually adjacent thermocouple pairs 21 to 23 are very short cables as compared with the transmission cable 12a. For this reason, the abnormality detection system 1 is also effective in that the load of the cable installation and the cost are reduced.

That is, the thermocouple abnormality detection system 1 according to the first embodiment can reduce the installation work and the cost of the temperature measurement system as compared with the conventional thermocouple abnormality detection system.

Further, measurement results of temperatures at very near positions can be obtained by a pair of thermocouple wires (two-wire thermocouple) housed in the same sheath. For this reason, as compared with the case where two temperature measurement results are obtained separately from two single wire thermocouples, the abnormality detection system 1 has no temperature measurement error depending on the positions of the thermocouple wires. Therefore, the abnormality detection system 1 can perform abnormality detection with sufficient accuracy.

Figure 4:
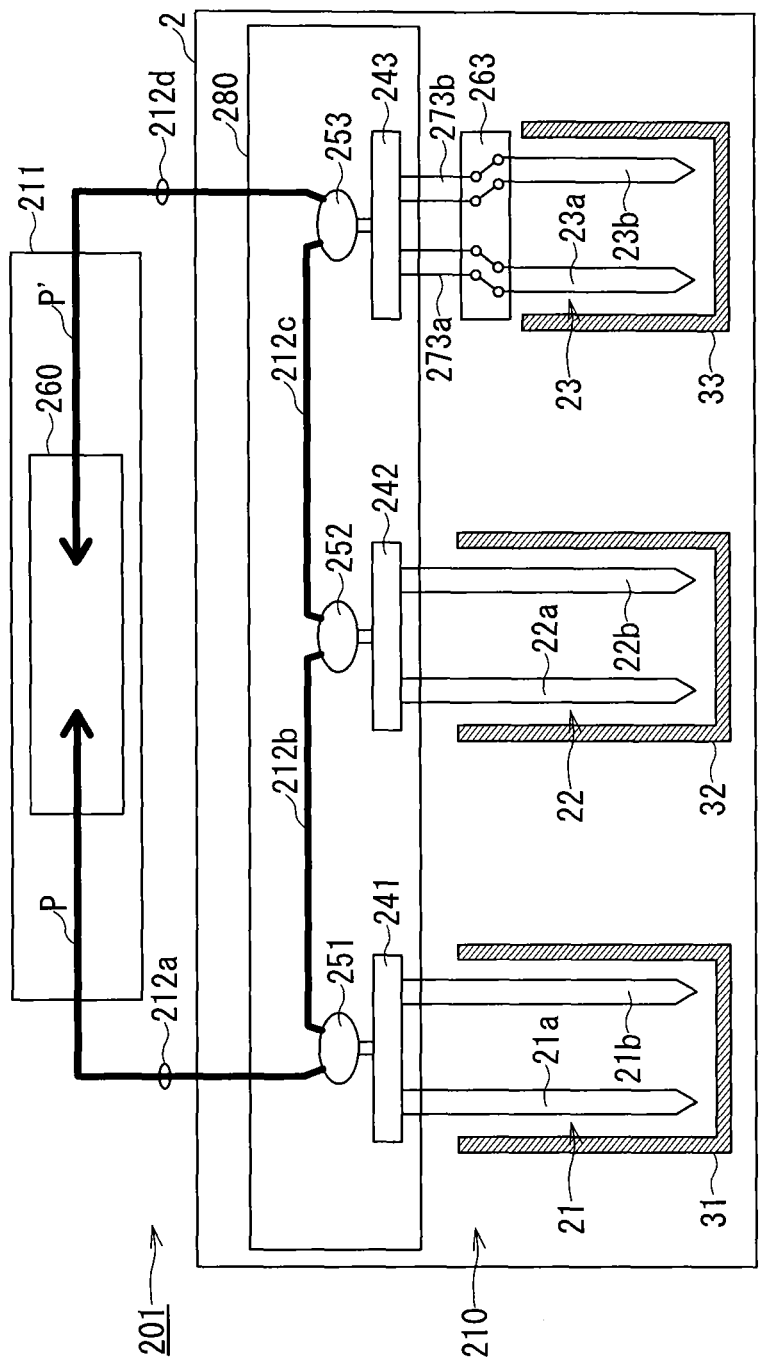
FIG. 4 is a view showing a configuration of a modification of the thermocouple abnormality detection system according to the first embodiment.

Note that as shown in FIG. 4, each of A/D converters 241 to 243 and each of adapters 251 to 253 may be provided in each of the thermocouple pairs 21 to 23. Further, the thermocouple 23 may be connected to the A/D converter 243 via a relay unit 263. Further, an abnormality detection circuit 260 (monitoring and control apparatus 211) may receive the transmission signals through two transmission cables 212a and 212d (second connection unit). Further, transmission cables 212b and 212c may be housed in a housing 280 from the viewpoint of protection from the surrounding environment. In the following, the details will be described with reference to the drawings.

FIG. 4 is a view showing a configuration of a modification of the thermocouple abnormality detection system according to the first embodiment.

The portions corresponding to those of the thermocouple abnormality detection system 1 according to the first embodiment are denoted by the same reference numerals and characters, and the description thereof will be omitted.

An abnormality detection system 201 includes a temperature measurement system 210 mainly provided in the industrial plant 2, the monitoring and control apparatus 211 provided, for example, outside the industrial plant 2, and the transmission cables 212a to 212d for connecting the temperature measurement system 210 to the monitoring and control apparatus 211.

Since the A/D converters 241 to 243 have almost the same configuration, and since the adapters 251 to 253 have almost the same configuration, only the A/D converter 241 and the adapter 251 are described, and the description of the other A/D converters 242 and 243 and the other adapters 252 and 253 is omitted.

The A/D converter 241 is provided in common to the thermocouple wires 21a and 21b. The A/D converter 241 AD-converts thermo-electromotive forces generated by the thermocouple wires 21a and 21b to transmission signals and outputs the transmission signals. The adapter 251 (transmission unit) transmits the transmission signals transmitted from the A/D converter 241 to the transmission cables 212a and 212b, respectively.

The thermocouple wires 23a and 23b of the thermocouple 23 are connected to the terminal box 263 serving as a relay unit and provided at the cold junction. The terminal box 263 is configured so that it can be installed in a high temperature environment. The terminal box 263 connects the thermocouple 23 to the compensation lead wires 273a and 273b. The terminal box 263 supplies the thermo-electromotive forces (small thermo-electromotive forces) generated by the thermocouple 23 to the compensation lead wires 273a and 273b (third connection unit). The compensation lead wires 273a and 273b supply the thermo-electromotive forces to the A/D converter 243.

The transmission cables 212a to 212d are, for example, optical cables, and transmit the transmission signals transmitted from the adapters 251 to 253 to the monitoring and control apparatus 211.

The transmission cable 212a connects the adapter 251 provided at the thermocouple 21 to the monitoring and control apparatus 211. The transmission cable 212b connects the adapter 251 provided at the thermocouple 21 to the adapter 252 provided at the thermocouple 22. The transmission cable 212c connects the adapter 252 provided at the thermocouple 22 to the adapter 253 provided at the thermocouple 23. The transmission cable 212d connects the adapter 253 provided at the thermocouple 23 to the monitoring and control apparatus 211.

That is, the transmission cables 212a and 212d as the second connection units connect the thermocouples 21 and 23 (adapters 251 and 253) to the monitoring and control apparatus 211 (abnormality detection circuit 260), respectively. The transmission cables 212b and 212c, as the first connection units, connect between the plurality of mutually adjacent thermocouples 21 to 23 (adapters 251 to 253), respectively.

The transmission cables 212a to 212d are connected by a wiring system (so-called Daisy Chain system) in which the mutually adjacent thermocouples 21 to 23 (adapters 251 to 253) are connected in series. The adapters 251 to 253 respectively transmit transmission signals to the transmission cables 212a to 212d which are respectively connected to the adapters 251 to 253. The respective transmission signals are successively transmitted through the required transmission cables 212b and 212c, and are eventually collected and transmitted, as transmission signals P and P', to the monitoring and control apparatus 211 through the transmission cables 212a and 212d.

The housing 280 (housing unit) is a housing which is made of, for example, iron or FRP (Fiber Reinforced Plastic) and has a closing property. In such a case where the housing 280 is installed at a high place, it is preferred that the housing 280 is made of FRP so as to be lightened in weight. The housing 280 has a size corresponding to the number of the thermocouples 21 to 23 housed in the housing 280.

The housing 280 houses the transmission cables 212a to 212d (a part of the transmission cables 212a and 212d), the A/D converters 241 to 243, the adapters 251 to 253, the cold junctions at which the thermocouples 21 and 22 are connected to the A/D converters 241 and 242, and connection points at which the A/D converter 243 is connected to the compensation lead wires 273a and 273b.

The transmission cables 212a and 212d, the thermocouples 21 and 22, and the compensation lead wires 273a and 273b are provided so as to pass through the housing 280. The housing 280 has required protective properties which can protect the apparatuses installed in the housing 280, for example, from hot water, steam and gas generated in the surrounding environment of the temperature measurement area, and from human activities.

Note that the housing 280 is provided to protect the transmission cables from the surrounding environment and hence is required only to house at least the transmission cables 212a to 212d.

The monitoring and control apparatus 211 includes the abnormality detection circuit 260. The configuration of the abnormality detection circuit 260 is substantially the same as the configuration of the abnormality detection circuit 60 shown in FIG. 2 except that the respective transmission signals p1a to p3a and p1b to p3b are taken out from the two transmission signals P and P', and hence the description and the illustration of the abnormality detection circuit 260 are omitted here.

In the thermocouple abnormality detection system 201, each of the thermocouple pairs 21 to 23 is provided with each of the A/D converters 241 to 243 and each of the adapters 251 to 253. The thermocouple abnormality detection system 201 can reduce the number of the A/D converters 241 to 243 and the number of the adapters 251 to 253, and can improve the efficiency of installation work and the economic efficiency.

Further, in the thermocouple abnormality detection system 201, the transmission route of the transmission signal is duplicated by the transmission cables 212a and 212d. For example, even when the transmission cable 212a is disconnected, the transmission signal P' is transmitted to the monitoring and control apparatus 211 via the transmission cable 212d. Therefore, the reliability of the thermocouple abnormality detection system 201 can be improved.

Further, the environment in the vicinity of the installation places of the thermocouples is high temperature and severe environment. Depending on the surrounding environment, there is a case where the electronic devices that are the A/D converter and the adapter cannot be arranged at the cold junction of the thermocouple.

In the thermocouple abnormality detection system 201 under such environment, the terminal box 263 and compensation lead wires 273a and 273b, which can be installed in the high temperature environment, are installed at the hot junction of the thermocouple. The thermocouple 23 is connected to the A/D converter 243 and the adapter 253 via the terminal box 263 and the compensation lead wires 273a and 273b. The A/D converter 243 and the adapter 253 can be installed in the place (site) away from the high temperature environment, and hence the temperature measurement and the abnormality detection of the thermocouple can be suitably performed without being influenced by the installation environment of the thermocouple.

Further, the thermocouple abnormality detection system 201 includes the housing 280, and thereby can suitably protect the A/D converters 241 to 243, the adapters 251 to 253, and the transmission cables 212a to 212d from the severe surrounding environment and from human activities. As a result, the thermocouple abnormality detection system 201 can further improve the reliability.

Note that each of the A/D converters 241 to 243 also has a software program having the calculation function for performing the A/D conversion processing, and hence may be provided with a function equivalent to the function of the abnormality detection circuit 260 by extending and utilizing the calculation function. That is, a circuit, which determines the detection of an abnormality of each of the thermocouple pairs 21 to 23 by comparing, with each other, the transmission signals obtained from each of the thermocouple pairs 21 to 23, may be provided in each of the A/D converters 241 to 243.

However, the abnormality detection method in which the abnormality detection function is provided in the A/D converters 241 to 243, cannot detect, for example, that the transmission signal cannot be correctly distributed and transmitted due to a failure or a malfunction caused in the adapters 251 to 253, or due to a failure caused in the transmission cables 212a to 212d. That is, since the transmission signals are supplied for the monitoring and control performed in the monitoring and control apparatus 211, it is preferred that the abnormality detection is performed by using the transmission signals received by the monitoring and control apparatus 211. From such a viewpoint, it is further preferred that the abnormality detection circuit is provided in the monitoring and control apparatus 211.

Second Embodiment

A thermocouple abnormality detection system and a detection method thereof of a second embodiment according to the present invention will be described with reference to the accompanying drawings.

Figure 5:
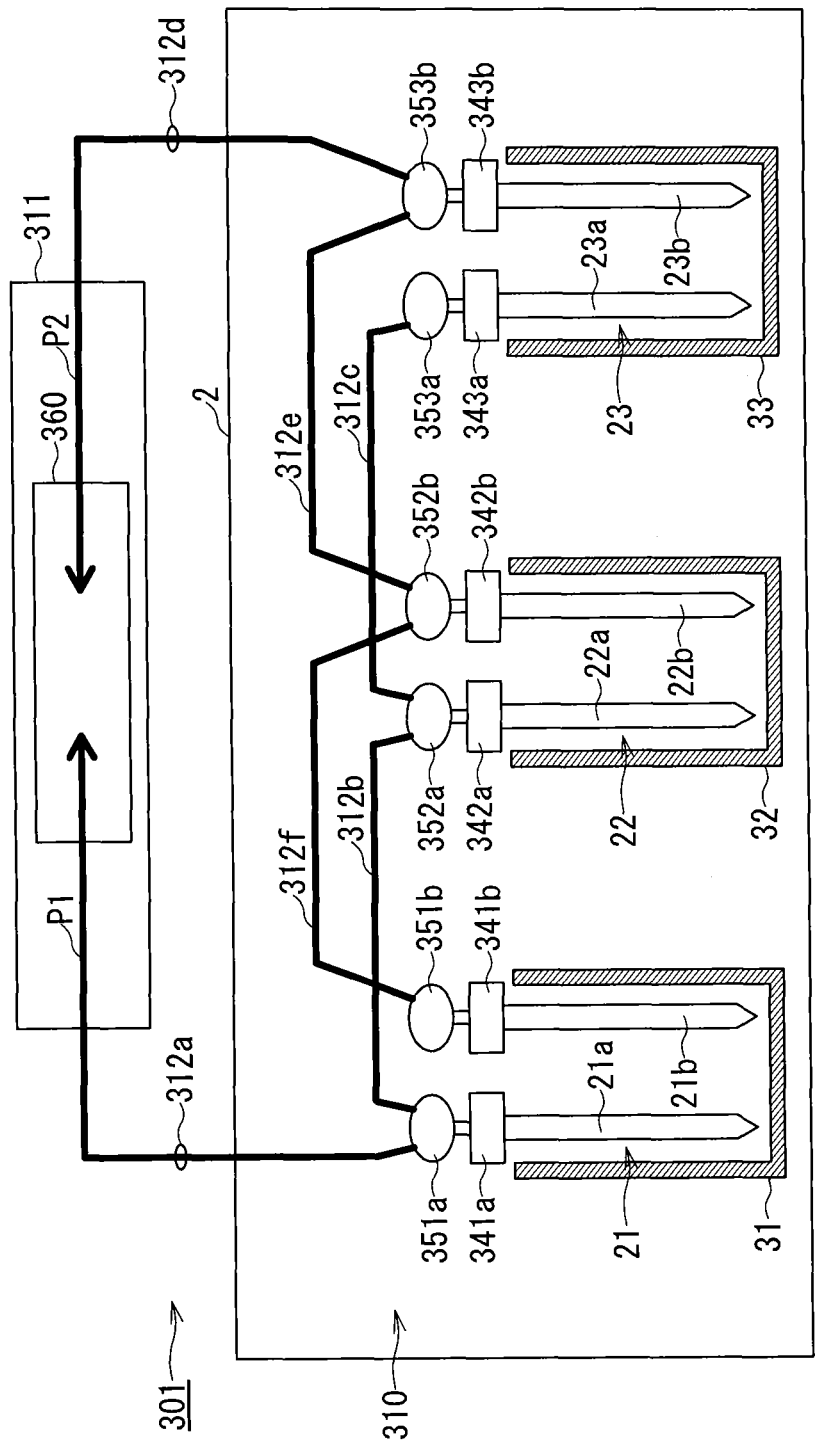
FIG. 5 is a view showing a second embodiment of a thermocouple abnormality detection system according to the present invention.

FIG. 5 is a view showing a second embodiment of a thermocouple abnormality detection system according to the present invention.

The same configurations and portions as those of the thermocouple abnormality detection system 1 of the first embodiment are denoted by the same reference numerals and characters, and the description thereof is omitted.

A thermocouple abnormality detection system 301 of the second embodiment is different from the first embodiment in that each of the transmission signals generated in each of the thermocouple pairs 21 to 23 is transmitted to the monitoring and control apparatus 311 via a different transmission route.

The abnormality detection system 301 includes a temperature measurement system 310 mainly provided in the industrial plant 2, a monitoring and control apparatus 311 provided, for example, outside the industrial plant 2, and transmission cables 312a to 312f for connecting the temperature measurement system 310 to the monitoring and control apparatus 311.

The transmission cables 312a to 312f are, for example, optical cables, and transmit the transmission signals transmitted from adapters 351a to 353a and 351b to 353b to the monitoring and control apparatus 311, respectively.

The transmission cables 312b and 312c (first connection unit) respectively connect between the thermocouple wires 21a to 23a as first thermocouple wires which are respectively provided in the thermocouple pairs 21 to 23 (between one set of the adapters 351a to 353a connected to the first thermocouple wires). The transmission cable 312a (second connection unit) connects the thermocouple wire 21a (adapter 351a) to the monitoring and control apparatus 311 (abnormality detection circuit 360). The adapter 351a is one of the one set of the adapter 351a to 353a connected to the first thermocouple wires.

Specifically, the transmission cable 312b connects between the thermocouple wire 21a of the thermocouple pair 21 and the thermocouple wire 22a of the thermocouple pair 22 (between the adapters 351a and 352a). The transmission cable 312c connects between the thermocouple wire 22a of the thermocouple pair 22 and the thermocouple wire 23a of the thermocouple pair 23 (between the adapters 352a and 353a).

The transmission cables 312e and 312f (first connection units) respectively connect between the thermocouple wires 21b to 23b as second thermocouple wires which are respectively provided in the thermocouple pairs 21 to 23 (between one set of the adapters 351b to 353b connected to the second thermocouple wires). The transmission cable 312d (second connection unit) connects the thermocouple wire 23b (adapter 353b) to the monitoring and control apparatus 311 (abnormality detection circuit 360). The adapter 353b is one of the one set of the adapter 351b to 353b connected to the second thermocouple wires.

Specifically, the transmission cable 312e connects between the thermocouple wire 22b of the thermocouple pair 22 and the thermocouple wire 23b of the thermocouple pair 23 (between the adapters 352b and 353b). The transmission cable 312f connects between the thermocouple wire 21b of the thermocouple pair 21 and the thermocouple wire 22b of the thermocouple pair 22 (between the adapters 351b and 352b).

The transmission cables 312a to 312f are connected by a wiring system (so-called Daisy Chain system) in which the mutually adjacent thermocouples 21 to 23 (adapters 351a to 353a and 351b to 353b) are connected in series. The transmission signal transmitted from each of the adapters 352a and 353a are successively transmitted through the required transmission cables 312b and 312c, so as to be transmitted to the adapter 351a. Eventually, the respective transmission signals are collected and transmitted as a transmission signal P1 to the monitoring and control apparatus 311 through the transmission cable 312a.

The transmission signal transmitted from each of the adapters 351b and 352b is successively transmitted through the required transmission cables 312f and 312e, so as to be transmitted to the adapter 353b. Eventually, the respective transmission signals are collected and transmitted as a transmission signal P2 to the monitoring and control apparatus 311 through the transmission cable 312d.

Figure 6:
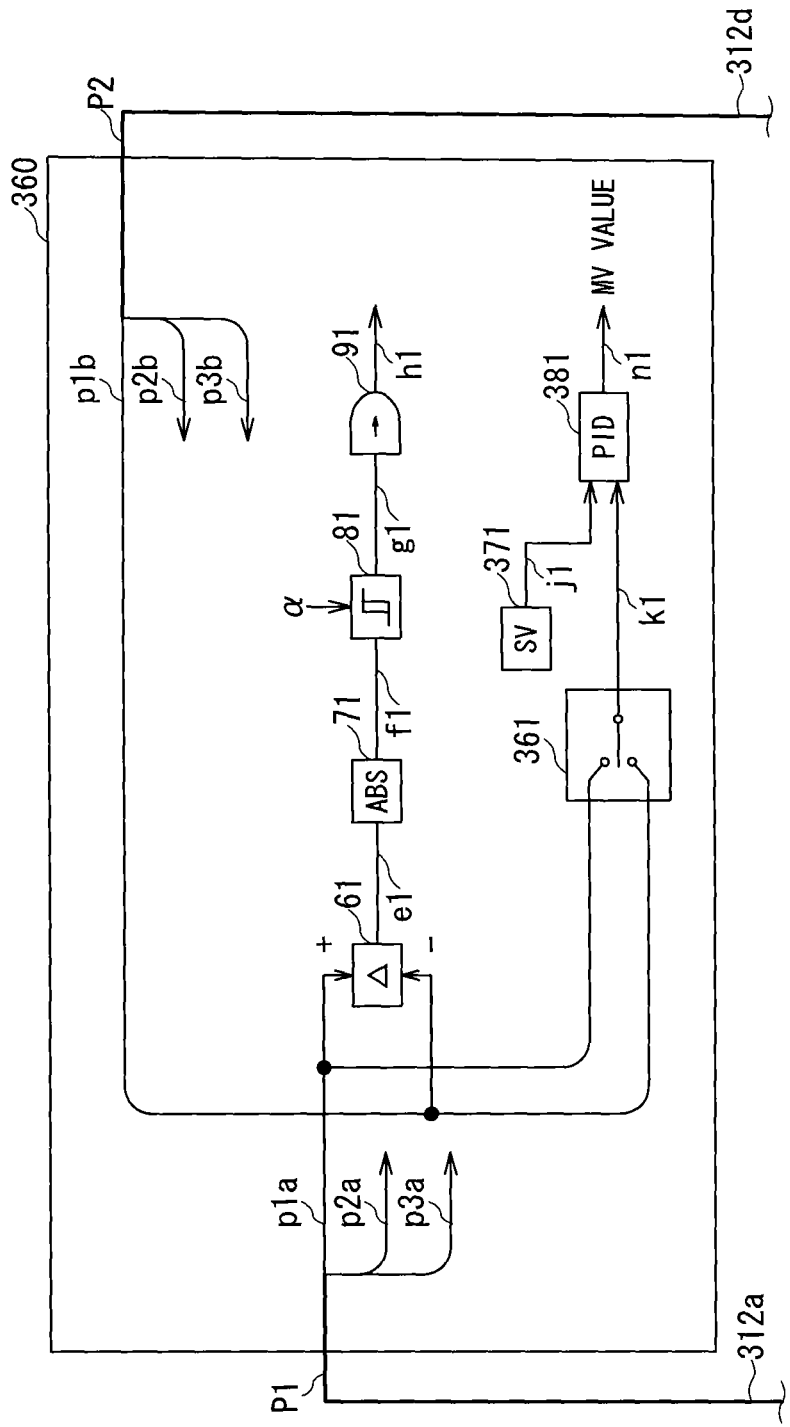
FIG. 6 is a view showing an internal configuration of the abnormality detection circuit provided in a monitoring and control apparatus.

FIG. 6 is a view showing an internal configuration of the abnormality detection circuit 360 provided in the monitoring and control apparatus 311.

Note that the circuit, into which the set of the signals p1a and p1b are inputted, is almost the same as the circuits into which the set of the other signals p2a and p2b, and the set of the other signals p3a and p3b are respectively inputted. Thus, the illustration and description of the circuits, into which the set of the other signals p2a and p2b, and the set of the other signals p3a and p3b are respectively inputted, are omitted.

In the abnormality detection circuit 360, the transmission signals p1a to p3a respectively outputted from the thermocouple wires 21a to 23a (first thermocouple wires) are taken out from the transmission signal P1 supplied through the transmission cable 312a, and are supplied to the subtractors 61, respectively. In the abnormality detection circuit 360, the transmission signals p1b to p3b respectively outputted from the thermocouple wires 21b to 21b (second thermocouple wires) are taken out from the transmission signal P2 supplied through the transmission cable 312d, and are supplied to the subtractors 61, respectively.

Since the processing applied to the transmission signals inputted into each of the subtractors 61 is almost the same as that in the first embodiment, the description of the processing is omitted here.

The transmission signals p1a and p1b are supplied to the subtractor 61 and at the same time are supplied to a switching selector 361. In the switching selector 361, the transmission signal inputted into a PID control calculator 381 is switched between the transmission signal p1a obtained from the thermocouple wire 21a (first thermocouple wire) and the transmission signals p1b obtained from the thermocouple wire 21b (second thermocouple wire). The switching selector 361 outputs the selected transmission signal as a PV value k1. The switching selector 361 is, for example, operated by the plant maintenance personnel.

A setting device 371 holds an SV value j1 set beforehand. The setting device 371 inputs the SV value j1 into the PID control calculator 381.

The PID control calculator 381 (control unit) is a PID controller for performing drive and control of a temperature regulation valve as a control object provided in the industrial plant 2. The PID control calculator 381 acquires an MV value n1 used for the control of the temperature regulation valve on the basis of the PV value k1 and the SV value j1.

Next, the effects of the thermocouple abnormality detection system 301 will be described.

The temperature information obtained from the thermocouples 21 to 23 during normal operation is used to detect an abnormality of the thermocouples 21 to 23, and at the same time, is used for the control of the temperature regulation valve.

For example, when a certain abnormality is caused in the thermocouple 21, and when the abnormality signal h1 is issued by the abnormality detection circuit 360, the plant maintenance personnel performs such an operation as referring to the trend graphs of the transmission signals p1a and the transmission signal p1b, and thereby determines the thermocouple in which the abnormality is caused.

For example, On the basis of the operation of the plant maintenance personnel, the switching selector 361 switches between the transmission signals so that the transmission signal obtained from the thermocouple wire determined as normal is selected as the PV value k1.

In the thermocouple abnormality detection system 301 according to the second embodiment, two transmission cables are provided to be connected to the monitoring and control apparatus 311. Thus, even when one of the transmission cables is disconnected, the transmission signal can be surely acquired via the other transmission cable.

That is, in the thermocouple abnormality detection system 301, the on-site transmission route (including the A/D converters 341a to 343a, the adapters 351a to 353a, and the transmission cables 312a to 312c), through which the transmission signals of the thermocouple wires 21a to 23a (first thermocouple wires) are transmitted, and the on-site transmission route (including the A/D converters 341b to 343b, the adapters 351b to 353b, and the transmission cables 312d to 312f), through which the transmission signals of the thermocouple wires 21b to 23b (second thermocouple wires) are transmitted, are made completely separated and independent from each other. Thereby, the thermocouple abnormality detection system 301 can surely detect not only the abnormality of the thermocouples 21 to 23 themselves, but also the abnormality of the on-site transmission routes.

For example, in the abnormality detection system 101 shown in FIG. 3, after one of the thermocouples 121 to 123 is deteriorated and finally disconnected, the abnormality of the one of the thermocouples 121 to 123 is detected.

On the other hand, in the thermocouple abnormality detection system 301, the abnormality of one of the thermocouples 21 to 23 can be detected in a stage before the one of the thermocouples 21 to 23 is completely disconnected, and hence the more normal and reliable temperature information can be obtained. Therefore, in the thermocouple abnormality detection system 301, the temperature information obtained from the thermocouples 21 to 23 can be used for the control of the temperature regulation valve, and the like.

Further, for example, after the disconnection is detected in the abnormality detection system 101 shown in FIG. 3, the plant maintenance personnel goes to the measurement area and performs the work of changing the connections in the terminal boxes 141 to 143. Further, the normal control of the temperature regulation valve is interrupted during the work.

On the other hand, in the thermocouple abnormality detection system 301, as soon as the deterioration of the thermocouples 21 to 23 is recognized at a stage prior to the occurrence of the disconnection, the transmission signal is switched in the monitoring and control apparatus 311. As a result, the thermocouple abnormality detection system 301 can realize high operation efficiency.

Note that one transmission cable 312d connected to the monitoring and control apparatus 311 is added, which results in an increase in the cost. However, when a large number of thermocouples are installed, the increase of the cost can be canceled, and hence the thermocouple abnormality detection system 301 can have the superiority that it can surely detect the abnormality.

Here, the effects of applying the connection technique of the transmission cables according to the second embodiment to the case where a large number of thermocouples are provided will be described with reference to the accompanying drawings.

FIG. 7A is a view showing a configuration of a thermocouple abnormality detection system 401 according to the second embodiment in the case where a large number of thermocouples are provided.

FIG. 7B is a view showing a configuration of a thermocouple abnormality detection system 501 as a comparison example of the thermocouple abnormality detection system shown in FIG. 7A.

The abnormality detection system 401 mainly includes a temperature measurement system 410, a monitoring and control apparatus 411, and transmission cables 412a and 412b for connecting the temperature measurement system 410 to the monitoring and control apparatus 411.

The abnormality detection system 501 mainly includes a temperature measurement system 510, a monitoring and control apparatus 511, and transmission cables 512a and 512b for connecting the temperature measurement system 510 to the monitoring and control apparatus 511.

In the Daisy Chain system, the transmission capacity permitted by the transmission cable is limited by a technical factor. The transmission cable has a maximum number of the connectable thermocouple pairs (thermocouples). The maximum number of the thermocouples is, for example, about several tens to several hundreds.

In FIG. 7A and FIG. 7B, the maximum number of the connectable thermocouples is assumed to be six (twelve thermocouple wires) for convenience of description. In the case where six or more thermocouples are connected by the Daisy Chain system, one set of the transmission cable can not connect the thermocouples more than the maximum number of the connectable thermocouples and the monitoring and control apparatus. That is, where the mutually adjacent thermocouple wires are simply connected, it is necessary to further add one set of the transmission cables as shown in FIG. 7B.

On the other hand, when the connection configuration of the transmission cables 312a to 312f, which configuration is described in the second embodiment in FIG. 5, is used, the number of short transmission cables for connecting the mutually adjacent thermocouple wires is increased, but the required number of the long transmission cables 412a and 412b for connecting the adapters (the thermocouples) to the monitoring and control apparatus 411 is the same.

Thus, in the case where the thermocouples more than the maximum number of connectable thermocouples are provided, the thermocouple abnormality detection system 301 according to the second embodiment can have high reliability without causing an increase in the facility cost.

Third Embodiment

A third embodiment of a thermocouple abnormality detection system and a detection method thereof according to the present invention will be described with reference to the accompanying drawings.

Figure 8:
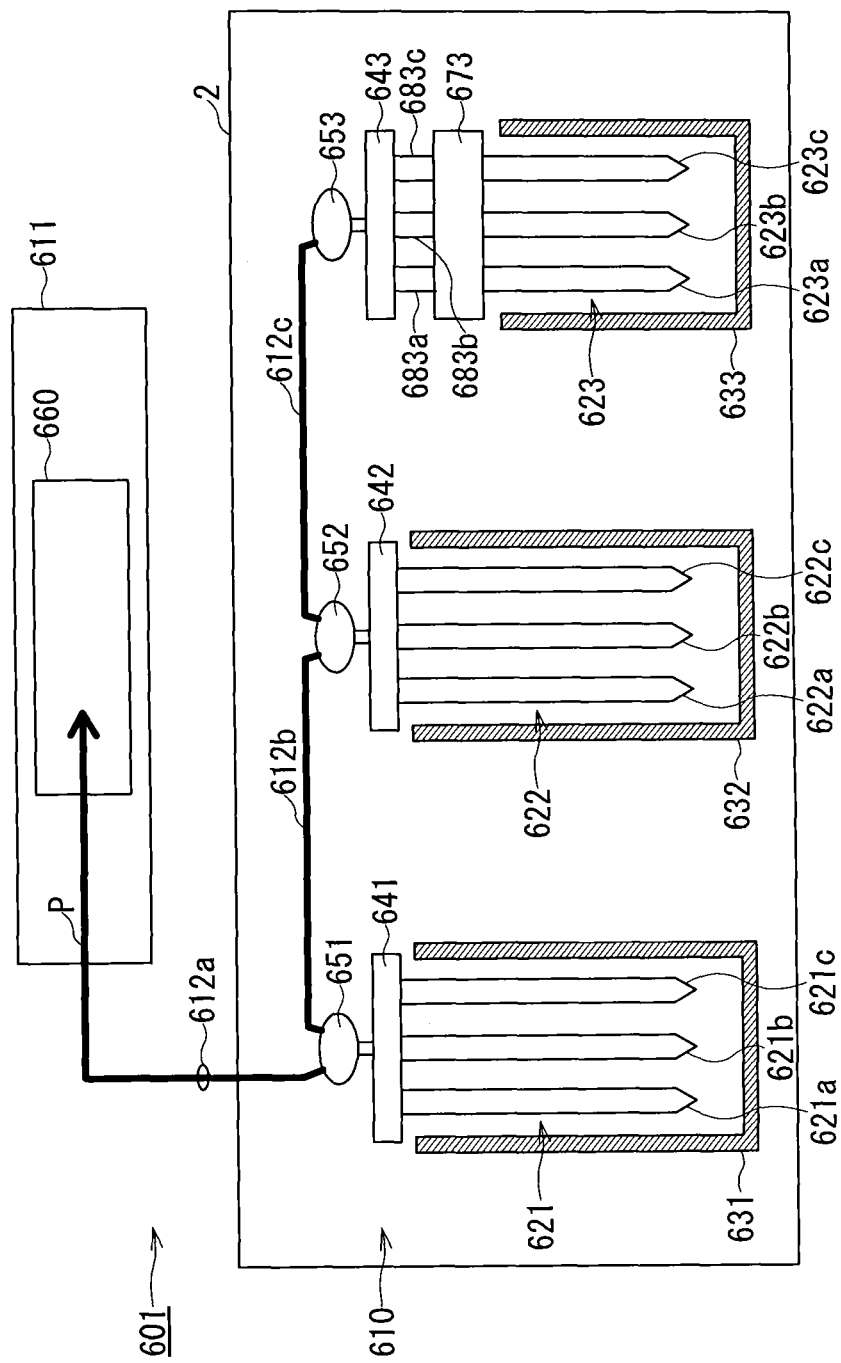
FIG. 8 is a view showing a third embodiment of a thermocouple abnormality detection system according to the present invention.

FIG. 8 is a view showing a third embodiment of a thermocouple abnormality detection system according to the present invention.

The configurations and portions corresponding to those of the thermocouple abnormality detection systems according to the first and second embodiments are denoted by the same reference numerals and characters, and the description thereof will be omitted.

The thermocouple abnormality detection system 601 according to the third embodiment is different from the first and second embodiments in that each of thermocouples 621 to 623 is a so-called three-wire thermocouple having each of thermocouple wires 621a to 623a, each of thermocouple wires 621b to 623b, and each of thermocouple wires 621c to 623c.

The abnormality detection system 601 includes a temperature measurement system 610 mainly provided in the industrial plant 2, a monitoring and control apparatus 611 provided, for example, outside the industrial plant 2, and transmission cables 612a to 612c for connecting the temperature measurement system 610 to the monitoring and control apparatus 611.

The thermocouples 621 to 623, the number of which is, for example, 100 to 300, are provided in the industrial plant 2 (for example, when 500 instrument sensors are provided as a whole). In the third embodiment, three thermocouples 621 to 623 are illustrated for convenience of description. Each of the thermocouples 621 to 623 is provided in a predetermined measurement area, such as an apparatus installation site area.

Since the thermocouples 621 and 622 have almost the same configuration, only the thermocouple 621 is described, and the description of the thermocouples 622 is omitted.

The thermocouple 621 includes the thermocouple wire 621a (first thermocouple), the thermocouple wire 621b (second thermocouple), and the thermocouple wire 621c (third thermocouple). The thermocouple 621 is housed in a sheath 631. The sheath (sheath) 631 has a cylindrical shape, and has the outer layer made of a heat-resistant alloy to thereby protect the thermocouple wires 621a to 621c housed therein. In the sheath 631, each of the thermocouple wires 621a to 621c is fixed and insulated by a filler, such as magnesium oxide.

Each of the thermocouple wires 621a to 621c has, at the tip portion thereof, a hot junction as a measurement place, and has a cold junction (head portion) at the end portion opposite to the measurement place. At the cold junctions of the thermocouple wires 621a to 621c, an A/D converter 641 and an adapter 651 are provided in this order.

The A/D converter 641 is provided in common to the thermocouple wires 621a to 621c. The A/D converter 641 A/D-converts thermo-electromotive forces generated by the thermocouple wires 621a to 621c to transmission signals, and outputs the transmission signals. The adapter 651 (transmission unit) transmits the transmission signals transmitted from the A/D converter 641 to the transmission cable 612a.

The thermocouple 623 includes the thermocouple wire 623a (first thermocouple), the thermocouple wire 623b (second thermocouple), and the thermocouple wire 623c (third thermocouple). The thermocouple 623 is housed in a sheath 633.

At the cold junctions of the thermocouple wires 623a to 623c, a converter 673, hard cables 683a to 683c, an A/D converter 643, and an adapters 653 are provided in this order.

The converter 673 is connected to the A/D converter 643 by the hard cables 683a to 683c. The converter 673 (current signal conversion unit) converts thermo-electromotive forces (small thermo-electromotive forces) generated by the thermocouple 623 to current signals of 4 to 20 mA (or voltage signals of 1 to 5 V) and outputs the signals. The current signals (voltage signals) are respectively transmitted to the A/D converter 643 via the hard cables 683a to 683c. The hard cables 688a to 683c have required rigidity and/or elasticity.

The A/D converter 643 (transmission signal conversion unit) A/D-converts the transmitted thermo-electromotive forces to transmission signals and outputs the transmission signals. The adapter 653 (transmission signal conversion unit) transmits the transmission signals transmitted from the A/D converter 643 to the transmission cable 612c.

The transmission cables 612a to 612c are, for example, optical cables, and transmit the transmission signals transmitted from the adapters 651 to 653 to the monitoring and control apparatus 611.

The transmission cable 612a connects the thermocouple 621 (adapter 651) to the monitoring and control apparatus 611. The transmission cable 612b connects the thermocouple 621 (adapter 651) to the thermocouple 622 (adapter 652). The transmission cable 612c connects the thermocouple 622 (adapter 652) to the thermocouple 623 (adapter 653).

That is, the transmission cable 612a as the second connection unit connects the thermocouple 621 (adapter 651) to the monitoring and control apparatus 611 (abnormality detection circuit 660). The transmission cables 612b and 612c as first connection units connect between the plurality of mutually adjacent thermocouples 621 to 623 (adapters 651 to 653), respectively.

The transmission cables 612a to 612c are connected by a wiring system (so-called Daisy Chain system) in which the mutually adjacent thermocouples 621 to 623 (adapters 651 to 653) are connected in series. The transmission signals transmitted from each of the adapters 652 and 653 are successively transmitted through required transmission cables 612b and 612c, so as to be transmitted to the adapter 651. Eventually, the respective transmission signals are collected and transmitted as transmission signal P to the monitoring and control apparatus 611 through the transmission cable 612a.

The monitoring and control apparatus 611 monitors the measurement values on the basis of the transmission signals which are measured by the thermocouples 621 to 623 and are transmitted by the on-site transmission. The monitoring and control apparatus 611 includes the abnormality detection circuit 660.

Figure 9:
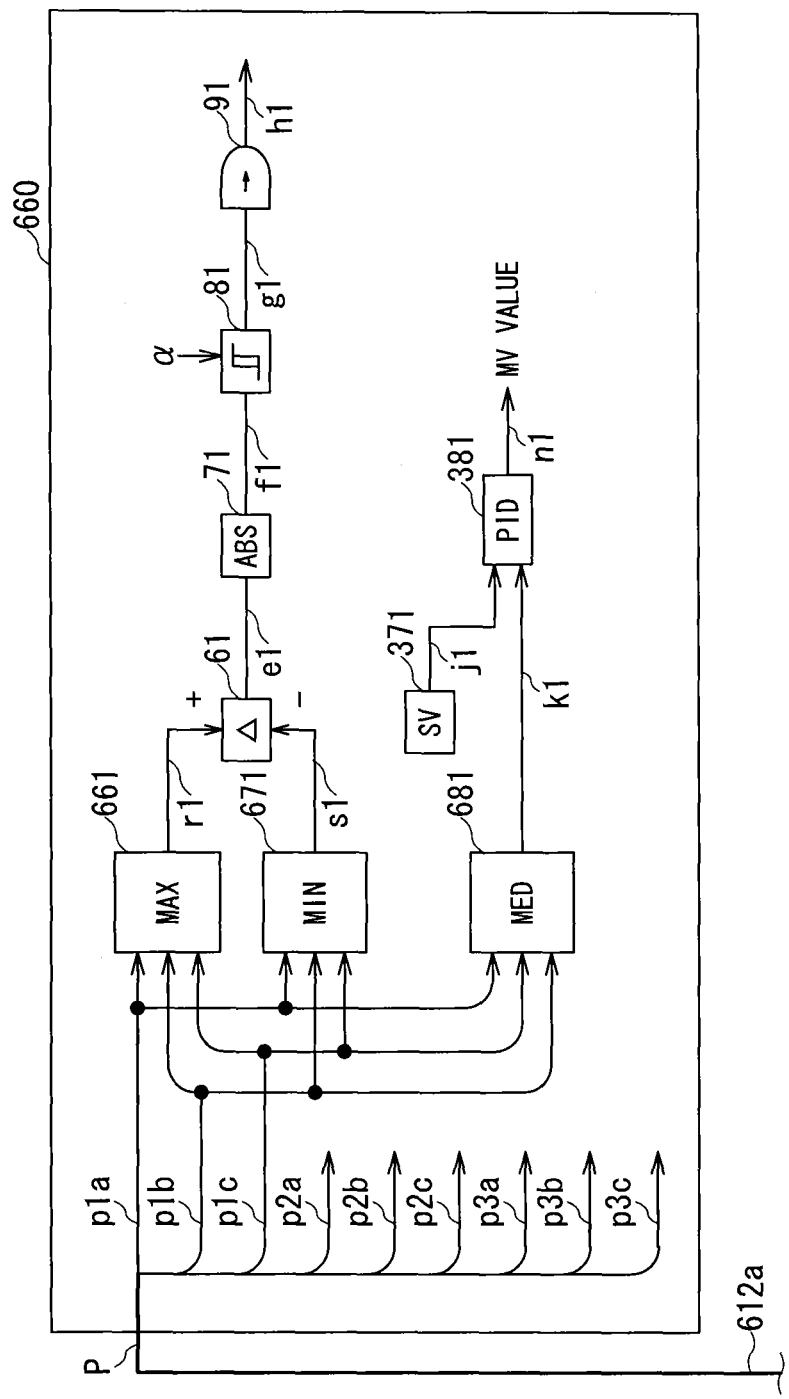
FIG. 9 is a view showing an internal configuration of the abnormality detection circuit provided in monitoring and control apparatus.

FIG. 9 is a view showing an internal configuration of the abnormality detection circuit 660 provided in the monitoring and control apparatus 611.

Note that a circuit into which signals p1a to p1c are inputted is substantially the same as the circuits into which the other signals p2a to p2c are inputted, and into which the other signals p3a to p3c are inputted. Thus, the description and illustration of the circuits, into which the other signals p2a to p2c and p3a to p3c are inputted, are omitted.

In the abnormality detection circuit 660, the transmission signals p1a to p3a outputted from the thermocouple wires 621a to 621c are taken out from the transmission signal P supplied through the transmission cable 612a, and are supplied to a maximum value selector 661, a minimum value selector 671, and an intermediate value selector 681.

The maximum value selector 661 selects the maximum value of the transmission signals p1a to p1c, and outputs the maximum value r1. The minimum value selector 671 selects the minimum of the transmission signals p1a to p1c, and outputs the minimum value s1.

The subtractor 61 calculates a deviation e1 by performing subtraction processing between the maximum value r1 and the minimum value s1. The absolute value converter 71 calculates an absolute deviation f1 by converting the absolute value of the deviation e1. The comparator 81 compares the absolute deviation f1 with the threshold value α set beforehand. The comparator 81 outputs the output g1, when the absolute deviation f1 is larger than the threshold value α. The timer 91 issues the abnormality signal h1 when the output g1 is continuously outputted during a predetermined time period (for example, 15 seconds).

That is, the abnormality detection circuit 660 compares, with each other, the transmission signals obtained from the thermocouple wire 621*a* (first thermocouple wire) to the thermocouple wire 621*b* (third thermocouple wire), and detects an abnormality of the thermocouple 621 at the time when the difference between the respective transmission signals is larger than the predetermined value.

The intermediate value selector 681 (intermediate value selection unit) selects the intermediate value k1 of the transmission signals p1*a* to p1*c*. The intermediate value k1 is inputted into the PID control calculator 381. The setting device 371 holds the SV value j1 set beforehand. The setting device 371 inputs the SV value j1 into the PID control calculator 381. The PID control calculator 381 controls the temperature regulation valve on the basis of the PV value k1 and the SV value j1.

That is, the PID control calculator 381 acquires the MV value n1 used for the control of the temperature regulation valve, by using the intermediate value of the transmission signals, which intermediate value is selected by the intermediate value selector 681.

The thermocouple abnormality detection system 601 according to the third embodiment can acquire three transmission signals from each of the thermocouples 621 to 623 which are respectively provided with the set of the three thermocouple wires 621*a* to 623*a*, the set of the three thermocouple wires 621*b* to 623*b*, and the set of the three thermocouple wires 621*c* to 623*c*, and can use the acquired transmission signals for detection of an abnormality of the thermocouples 621 to 623. The abnormality detection system 601 compares, with each other, the three transmission signals of each of the thermocouples. Thereby, on the basis of the difference between the three transmission signals, the abnormality detection system 601 can surely detect the deterioration of each of the thermocouples at a stage prior to the occurrence of the disconnection.

The abnormality detection system 601 selects an intermediate value from the values of the three transmission signals, and uses the intermediate value for the control of the temperature regulation valve, and the like. Thereby, the abnormality detection system 601 can select and provide a normal value as the temperature information used for the control.

Although several embodiments of the present invention have been described above, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A thermocouple abnormality detection system comprising:
   a plurality of thermocouples each including a plurality of thermocouple wires housed in a sheath, wherein the plurality of thermocouple wires includes a first thermocouple wire and a second thermocouple wire;
   a transmission signal conversion unit configured to convert a thermo-electromotive force generated by each of the plurality of the thermocouple wires to a transmission signal and to output the transmission signal;
   a plurality of transmission units configured to transmit the transmission signal outputted from the transmission signal conversion unit;
   an abnormality detection circuit configured to detect an abnormality of each of the plurality of the thermocouples by comparing, with each other, the transmission signals obtained from the plurality of thermocouple wires provided in each of the thermocouples;
   a first connection unit configured to connect between the plurality of transmission units; and
   at least one second connection unit configured to connect one of the plurality of the transmission units to the abnormality detection circuit,
   wherein
      the first connection unit is configured to connect between one set of the transmission units connected to the first thermocouple wires of each of the plurality of thermocouples, and an additional first connection unit is configured to connect between one set of the transmission units connected to the second thermocouple wires of each of the plurality of thermocouples;
      the second connection unit is configured to connect, to the abnormality detection circuit, one of the set of the transmission units connected to the first thermocouple wires, and an additional second connection unit is configured to connect, to the abnormality detection circuit, one of the set of the transmission units connected to the second thermocouple wires; and
      each of the plurality of the transmission units transmits the transmission signal to the transmission unit connected to the second connection unit via the first connection unit so as to make the transmission signal transmitted to the abnormality detection circuit via the second connection unit.

2. The thermocouple abnormality detection system according to claim 1, further comprising:
   a control unit configured to control a control object by using the transmission signal; and
   a switching unit configured to switch the transmission signal inputted into the control unit between the plurality of transmission signals obtained from the plurality of thermocouple wires provided in the thermocouple.

3. The thermocouple abnormality detection system according to claim 1, wherein the plurality of thermocouple wires are the first thermocouple wire, the second thermocouple wire, and a third thermocouple wire.

4. The thermocouple abnormality detection system according to claim 3, wherein the abnormality detection circuit is configured to compare, with each other, the transmission signals obtained from the first thermocouple wire, the second thermocouple wire, and the third thermocouple wire, and is configured, when the difference between the respective transmission signals is larger than a predetermined value, to detect an abnormality of the thermocouple.

5. The thermocouple abnormality detection system according to claim 4, further comprising:
   an intermediate value selection unit configured to select an intermediate value of the transmission signals obtained from the first thermocouple wire, the second thermocouple wire, and the third thermocouple wire; and
   a control unit configured to control a control object by using the intermediate value of the transmission signals.

6. The thermocouple abnormality detection system according to claim 1, wherein the transmission signal conversion unit is provided in common to the plurality of thermocouple wires provided in each of the plurality of the thermocouples.

7. The thermocouple abnormality detection system according to claim 1, further comprising a housing unit configured to house at least the first connection unit and the second connection unit.

8. A thermocouple abnormality detection method comprising:
- preparing a plurality of thermocouples each including a plurality of thermocouple wires housed in a sheath, wherein the plurality of thermocouple wires includes a first thermocouple wire and a second thermocouple wire;
- converting the thermo-electromotive force generated by each of the plurality of the thermocouple wires into a transmission signal and outputting the transmission signal;
- transmitting, by a plurality of transmission units, the outputted transmission signal, wherein
  - a first connection unit is configured to connect between the plurality of transmission units; and
  - at least one second connection unit is configured to connect one of the plurality of the transmission units to the abnormality detection circuit; and
- detecting, by the abnormality detection circuit, an abnormality of each of the plurality of the thermocouples by comparing, with each other, the transmission signals obtained from the plurality of thermocouple wires provided in each of the thermocouples, wherein
- the first connection unit is configured to connect between one set of the transmission units connected to the first thermocouple wires of each of the plurality of thermocouples, and an additional first connection unit is configured to connect between one set of the transmission units connected to the second thermocouple wires of each of the plurality of thermocouples;
- the second connection unit is configured to connect, to the abnormality detection circuit, one of the set of the transmission units connected to the first thermocouple wires, and an additional second connection unit is configured to connect, to the abnormality detection circuit, one of the set of the transmission units connected to the second thermocouple wires; and
- the transmitting comprises transmitting, by each of the plurality of the transmission units, the transmission signal to the transmission unit connected to the second connection unit via the first connection unit, and transmitting the transmission signal to the abnormality detection circuit via the second connection unit.

* * * * *